US012612028B2

(12) United States Patent
Subramanian et al.

(10) Patent No.: US 12,612,028 B2
(45) Date of Patent: Apr. 28, 2026

(54) PROPULSION TORQUE CONTROL DURING BRAKE-RELEASE IN A VEHICLE

(71) Applicant: Volvo Truck Corporation, Gothenburg (SE)

(72) Inventors: Chidambaram Subramanian, Greensboro, NC (US); Jeffrey Peddycord, Walnut Cove, NC (US)

(73) Assignee: Volvo Truck Corporation, Gothenburg (SE)

( * ) Notice: Subject to any disclaimer, the term of this patent is extended or adjusted under 35 U.S.C. 154(b) by 25 days.

(21) Appl. No.: 18/760,324

(22) Filed: Jul. 1, 2024

(65) Prior Publication Data

US 2025/0010841 A1     Jan. 9, 2025

(30) Foreign Application Priority Data

Jul. 6, 2023    (EP) .................................... 23183856

(51) Int. Cl.
B60W 10/18 (2012.01)
B60W 30/18 (2012.01)
(52) U.S. Cl.
CPC ........ B60W 10/18 (2013.01); B60W 30/1819 (2013.01); B60W 2540/10 (2013.01)
(58) Field of Classification Search
CPC .... B60W 10/18; B60W 10/06; B60W 10/184; B60W 30/1819; B60W 30/18027; B60W 30/1888; B60W 2540/10; B60W 2510/10; B60W 2510/12; B60W 2710/0606
See application file for complete search history.

(56) References Cited

U.S. PATENT DOCUMENTS

| | | | |
|---|---|---|---|
| 8,239,107 B2 | 8/2012 | Mair | |
| 9,481,352 B2 * | 11/2016 | Yu | B60W 30/18027 |
| 10,293,800 B2 | 5/2019 | Yokoyama et al. | |
| 2004/0231951 A1 * | 11/2004 | Hasegawa | B60W 10/184 |
| | | | 192/220 |
| 2006/0152079 A1 * | 7/2006 | Werner | B60T 7/12 |
| | | | 303/191 |
| 2010/0138129 A1 * | 6/2010 | Mallet | B60T 7/122 |
| | | | 701/83 |
| 2011/0297462 A1 | 12/2011 | Grajkowski et al. | |
| 2018/0015926 A1 | 1/2018 | Cunningham et al. | |

(Continued)

FOREIGN PATENT DOCUMENTS

| | | |
|---|---|---|
| EP | 3144195 A1 | 3/2017 |
| WO | 2022136597 A1 | 6/2022 |

OTHER PUBLICATIONS

Extended European Search Report for European Patent Application No. 23183856.6, mailed Jan. 2, 2024, 9 pages.

*Primary Examiner* — George C Jin
(74) *Attorney, Agent, or Firm* — Withrow & Terranova, PLLC

(57) ABSTRACT

A controller for a vehicle, configured to determine a take-off intent, and, in response to determining the take-off intent, i) initiate a release of a brake for at least one wheel or wheel axle of the vehicle, and ii) inhibit an application of propulsion torque to the at least one wheel or wheel axle during a finite time period (TR) related to a time required for releasing the brake. Provided is also an automated brake-release system including such a controller, a vehicle, a method, computer program product and computer-readable storage medium.

14 Claims, 5 Drawing Sheets

(56) References Cited

U.S. PATENT DOCUMENTS

2018/0141556 A1\*   5/2018   Goh ................. B60W 30/18118
2019/0217862 A1     7/2019   Pursifull et al.
2023/0331227 A1\*  10/2023   Rylander .............. B60W 40/13
2024/0166177 A1\*   5/2024   Saotome ................. B60T 8/171
2025/0189004 A1\*   6/2025   Putz ........................ F16D 65/38

\* cited by examiner

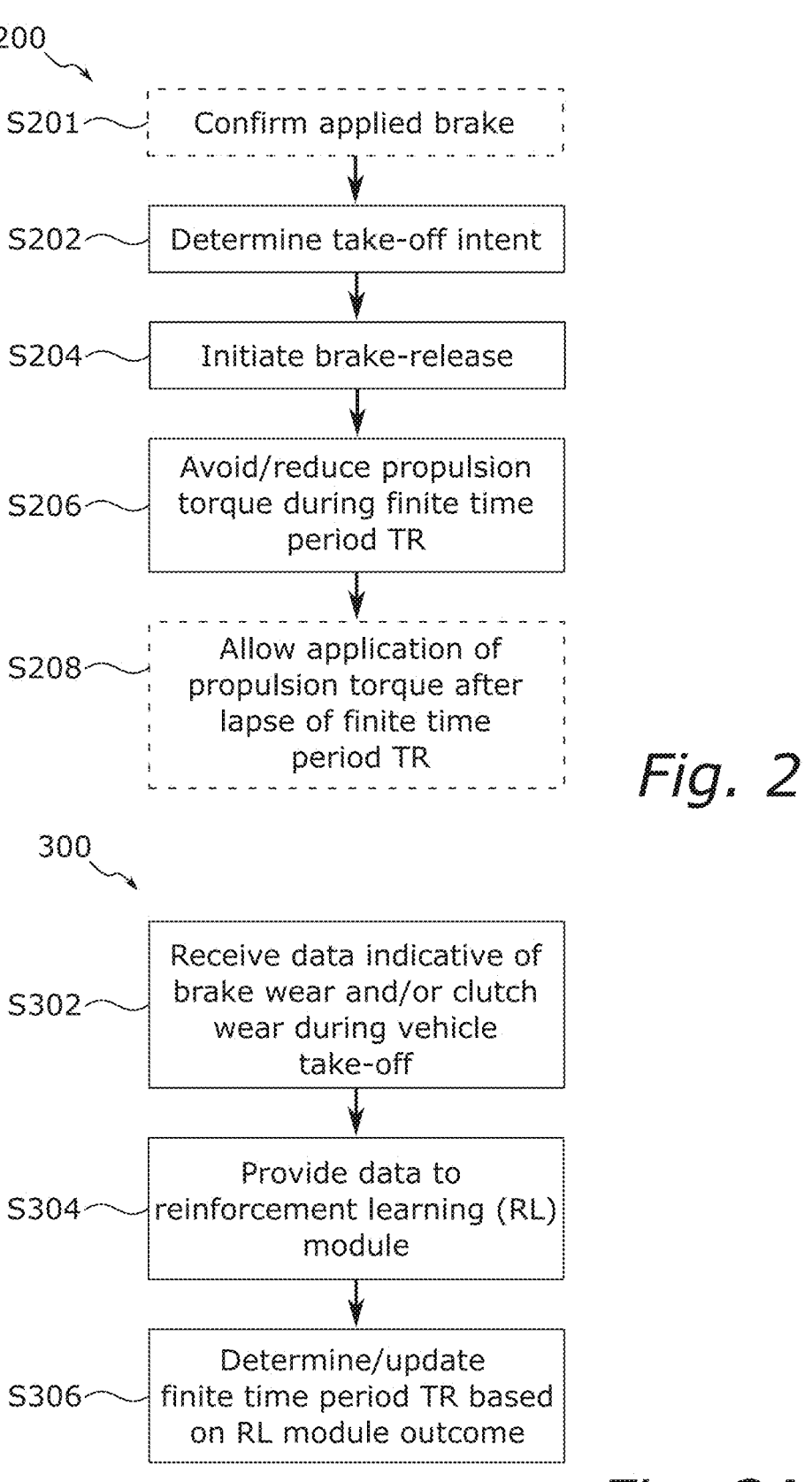

200

S201 — Confirm applied brake

S202 — Determine take-off intent

S204 — Initiate brake-release

S206 — Avoid/reduce propulsion torque during finite time period TR

S208 — Allow application of propulsion torque after lapse of finite time period TR

S302 — Receive data indicative of brake wear and/or clutch wear during vehicle take-off S304 — Provide data to reinforcement learning (RL) module S306 — Determine/update finite time period TR based on RL module outcome

S312 — Receive data indicative of vehicle speed/movement

S314 — Receive data indicative of rotation of wheel or wheel axis

S316 — Confirm movement of vehicle even though wheel or wheel axis is not rotating S318 — In response, increase finite time period TR

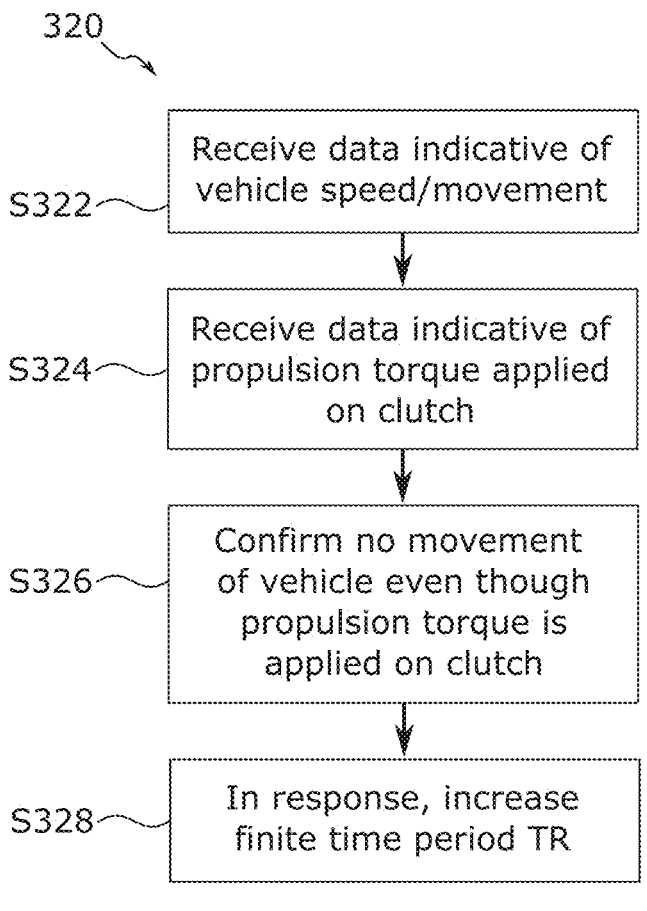
320
S322 — Receive data indicative of vehicle speed/movement
S324 — Receive data indicative of propulsion torque applied on clutch
S326 — Confirm no movement of vehicle even though propulsion torque is applied on clutch
S328 — In response, increase finite time period TR
*Fig. 3C*
410    430
420    440
400    510
*Fig. 4A*
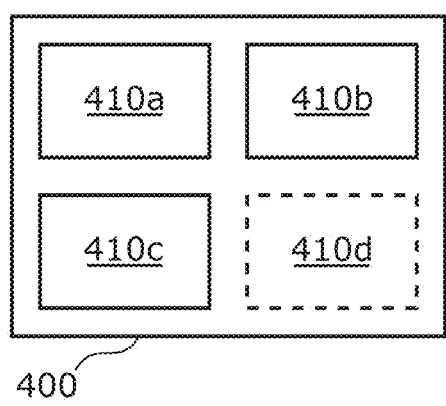
410a    410b
410c    410d
400
*Fig. 4B*

PROPULSION TORQUE CONTROL DURING BRAKE-RELEASE IN A VEHICLE

PRIORITY APPLICATIONS

The present application claims priority to European Patent Application No. 23183856.6, filed on Jul. 6, 2023, and entitled "PROPULSION TORQUE CONTROL DURING BRAKE-RELEASE IN A VEHICLE," which is incorporated herein by reference in its entirety.

TECHNICAL FIELD

The disclosure relates generally to braking of vehicles. In particular aspects, the disclosure relates to propulsion torque control during (automated) brake-release in a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Contemporary vehicles, such as e.g. various heavy or semi-heavy vehicles, may be equipped with a system which automatically engages a brake in order to prevent the vehicle from rolling away once stopped or parked. For example, there are systems that may detect that the vehicle has come to a halt, and which in response thereto may automatically engage a parking or service brake of the vehicle. For vehicles which tend to go through multiple stop-and-go operations each day, such as e.g. garbage trucks, delivery trucks, busses, or similar, this may be particularly beneficial as it reduces the risk of an accidental roll-away caused by the driver haven forgotten to activate e.g. a parking brake before leaving the vehicle cabin. Likewise, there are also such systems available which, in addition to automatically applying the brakes, may also detect that the driver depresses a throttle pedal of the vehicle (or shows any other form of take-off intent) once having returned to the cabin, and which may then automatically also release the (automatically) applied brake in response thereto.

The present disclosure seeks to develop the available such automated brake-release technology further and to mitigate one or more shortcomings thereof.

SUMMARY

As the inventor has realized, one shortcoming of contemporary systems for automatically applying and releasing e.g. a parking brake is that the systems are often based on open-loop control, which provides no guarantee that propulsion torque is not applied to the wheels while the brakes are still engaged. Often, this is caused by the release of the brake being a slower process than that of applying propulsion torque. Using a garbage truck as an example of such a vehicle, performing hundreds of stop-and-go operations a day may thus cause excessive wear to the vehicle's powertrain and/or brakes over time if, for each such stop-and-go operation, there is at least some time during which both braking torque and propulsion torque are concurrently applied to the wheels of the vehicle.

In order to improve on this situation, the present disclosure provides an improved controller for a vehicle, an automated brake-release system for a vehicle and including such a controller, a vehicle including such a controller or automated brake-release system, a method performed in such a controller, a computer program product and computer-readable storage medium as defined in and by the accompanying independent claims. Various alternatives of the improved controller, system, vehicle, method, computer program product and computer-readable storage medium are defined in and by the accompanying dependent claims.

According to a first aspect of the present disclosure, there is provided a controller for (automated brake-release in) a vehicle. The controller is configured to determine a take-off intent. The controller is configured to, in response to determining the take-off intent, i) (automatically) initiate a release of a brake for at least one wheel or wheel axle of the vehicle, and ii) (automatically) inhibit an application of propulsion torque to the at least one wheel or wheel axle during a finite time period related to a time required for releasing the brake. The first aspect of the disclosure may seek to improve upon currently available technology by, while still implementing open-loop control which is cheaper and easier to implement than e.g. a closed-loop control relying on various sensor information (such as information about brake pressure or similar), reduce or even eliminate the risk of concurrent application of both propulsion and braking torque during take-off of the vehicle. By properly adjusting the finite time period, a technical benefit of the envisaged controller may include that it introduces a delay of the application of any propulsion torque until the brake has had time to be sufficiently or completely released, which can dramatically reduce the wear on the vehicle's drive train and/or brakes for vehicles which perform multiple stop-and-go operations during a day. As such wear may also, if left unattended, eventually cause failure of one or more parts of the vehicle, the envisaged controller thus also improves upon the overall vehicle safety, while also potentially reducing costs related to maintenance and/or vehicle standstills due to such failures.

As used herein, a "brake" may e.g. be a service/work brake, a parking brake, or any other device capable of applying braking force/torque to at least one wheel or wheel axle of the vehicle. Such brakes may e.g. be hydraulic, pneumatic, or similar, and may be operated by-wire or mechanically. As used herein, to "inhibit an application of propulsion torque" may include preventing any such torque from being applied, or to at least reduce the amount of applied torque to a level which is considered to cause no or little wear on e.g. the brakes and/or drivetrain of the vehicle in case of concurrent application of propulsion torque. Phrased differently, the envisaged inhibition may be complete or partial.

A controller as envisaged herein may of course include all the means necessary to communicate with one or more external entities, such as the brake, various sensors from which signals may be used to determine the take-off intent, and similar. The controller may for example be provided with one or more signal interfaces for communicating with e.g. the brake and/or such sensors, either directly or via e.g. a common bus (such as e.g. a CAN-bus) or similar.

Optionally in some examples, including in at least one preferred example, the controller may be further configured to determine the take-off intent while the brake is applied. A technical benefit may include that the envisaged controller only needs to act in a situation where the vehicle brake is already applied when the driver (or passenger, or e.g. an automated system in control of driving the vehicle) wants to take-off.

Optionally in some examples, including in at least one preferred example, to determine the take-off intent may include to detect a depressing of a throttle pedal of the vehicle and/or an engagement or shifting of a transmission of the vehicle. A technical benefit may include that e.g. signals which are already available (e.g. on a vehicle CAN-bus or similar) can be used to determine the take-off intent, without the need for any further sensors. That the driver depresses the throttle pedal can be used as a signal that the driver wants the vehicle to start moving, i.e. the intent of the driver is for the vehicle to take off. The same applies to e.g. the driver putting the transmission in forward- or drive-mode, or similar, in particular if the transmission was previously put in e.g. neutral or parking mode.

Optionally in some examples, including in at least one preferred example, to determine the take-off intent may include to detect a closing of a door of the vehicle. A technical benefit may include that no additional sensors other than those already present in contemporary vehicles may be required. That the door (such as e.g. the driver's or passenger's door) is closed can be used a signal that the driver (or passenger) is now in the vehicle and would soon like to take-off.

Optionally in some examples, including in at least one preferred example, to determine the take-off intent may include to detect a fastening of a seatbelt (such as e.g. the driver's or passenger's seatbelt) of the vehicle. A technical benefit may include that the seatbelt being fastened can be used as a signal that the driver or passenger is now back in the chair and would soon like to take-off. It should be noted that the seatbelt, or e.g. the closing of a particular door, need not necessarily be the seatbelt and/or door of the driver, but may just as well be e.g. the seatbelt and/or door of a passenger. For example, in garbage trucks, it is envisaged that the driver remains in the vehicle while the co-driver is the one who jumps in and out of the vehicle during the stop-and-go operations, in case which the seatbelt and/or the door of the co-driver/passenger may serve as a better indication of a take-off intent than those of the driver.

Generally herein, it is envisaged that any of the proposed examples of how to detect the take-off intent may be combined. For example, detecting a closing of a door may be combined with detecting a fastening of a seatbelt and/or a depressing of the throttle pedal, to further increase the probability of accurately detecting the true intent of the driver. For example, it may be a stronger indicator that the door is closest, the seat belt is fastened, and the throttle pedal is depressed in this particular order, as such a particular order may be envisaged as being the most likely in case of a true take-off intent. Likewise, for example, detecting a closing of a door, fastening of a seatbelt, etc. may be combined with previous detections of an opening of the same door, a releasing of the same seatbelt, etc., to further strengthen these events as indicators for the true intent of the driver.

Optionally in some examples, including in at least one preferred example, to (automatically) inhibit the application of propulsion torque may include to send a propulsion torque limitation command to an engine or powertrain of the vehicle. For example, such a command may include an instruction to delay any torque-application during the next X milliseconds, or similar, or e.g. to limit the applied torque during the next X milliseconds to a level which is not considered harmful to the brakes and/or drivetrain in the event that brake torque is concurrently applied. Here, "X" corresponds to the finite time duration. The command to limit torque may e.g. be communicated to the engine and/or drivetrain using one of the available communication buses already available in contemporary vehicles, such as e.g. one or more CAN-buses or similar.

Optionally in some examples, including in at least one preferred example, the controller may further be configured to, before determining the take-off intent, automatically apply (e.g. by sending a suitable instruction to) the brake in response to determining an intent of a driver or passenger of the vehicle to leave the vehicle. Such a procedure may e.g. be performed as part of a process for automatically applying a brake when the vehicle stops and e.g. the driver leaves the cabin. A technical benefit may include to reduce the risk of an accidental runaway of the vehicle due to the driver e.g. forgetting to apply a parking brake before leaving the cabin. As discussed above, and generally herein, when referring to a "driver" of the vehicle, it may just as well be referred to a co-driver or e.g. passenger of the vehicle, such as related to e.g. a garbage truck or similar wherein a driver and passenger cooperates to perform a common task using the vehicle.

Optionally in some examples, including in at least one preferred example, to determine the intent of the driver or passenger to leave the cabin may include to detect a release of a throttle pedal of the vehicle and/or a disengagement or shifting of a transmission of the vehicle. A technical benefit may include that the driver releasing a throttle pedal may serve as an indication that the driver or passenger is soon to leave the cabin, and likewise for the driver e.g. shifting the transmission to e.g. a neutral or parking position.

Optionally in some examples, including in at least one preferred example, to determine the intent of the driver or passenger to leave the cabin may include to detect a releasing of a seatbelt of the vehicle. A technical benefit may include that releasing a seatbelt may serve as an indication that the driver or passenger is soon to exit the vehicle, as such exiting requires first releasing the seatbelt.

Optionally in some examples, including in at least one preferred example, to determine the intent of the driver or passenger to leave the vehicle may include to detect an opening of a door of the vehicle (e.g. a passenger's or driver's door), for the reasons already explained above.

Optionally in some examples, including in at least one preferred example, to determine the intent of the driver or passenger to leave the vehicle may include to detect an imminent stopping of the vehicle. This may e.g. be based on route data combined with positioning data, to figure out that the vehicle is now at a position where the vehicle is supposed to stop and e.g. deliver or pick up goods, or similar. Other reasons for why the vehicle may soon stop are of course also possible, but not elaborated on further herein.

Optionally in some examples, including in at least one preferred example, the controller may further be configured to, in response to a lapsing of the finite time period, end the (automatic) inhibiting of the application of propulsion torque performed to avoid concurrent application of propulsion and braking torque. Phrased differently, once the finite time period has lapsed, it may (by the controller) be considered safe to start applying propulsion torque to the at least one wheel or wheel axle, as the probability of the brake being sufficiently or completely released is then high. Lapsing of the finite time period may e.g. include starting a clock once the inhibiting of the application of propulsion torque starts, and re-allow such propulsion torque once the clock indicates that the finite time period has now lapsed. Usually, the finite time period as discussed herein is on the order of a few or several milliseconds, and depends more specifically on how much slower it takes to release the brake than to apply propulsion torque, which may of course be different between difference vehicles and the finite time period can be adapted accordingly. A technical benefit may include that the finite time period may be provided predefined from the factory, and also that it may instead defined by using e.g. one or more control inputs of the vehicle (such as a dashboard display/input terminal, a mobile app, a website, a control device for such purposes, or similar, or be updated and/or defined using e.g. reinforcement learning as will be described in more detail later herein).

Optionally in some examples, including in at least one preferred example, the controller may be further configured to determine and/or update (a value of) the finite time period by providing data indicative of brake wear and/or clutch wear during take-off of the vehicle to a reinforcement learning model trained to determine and/or update (the value of) the finite time period based on such data. A technical benefit may include that the finite time period may thus be adapted to a particular vehicle, and e.g. be updated as the conditions change (such as due to e.g. changing weather, vehicle aging, or due to various other dynamic conditions).

Optionally in some examples, including in at least one preferred example, the reinforcement learning model may be implemented by the controller and be configured to increase the finite time period in response to determining that, as an indication of brake wear, the vehicle is moving even though the at least one wheel or wheel axle is not rotating. This may serve as an indication that the brake is still being applied concurrently with propulsion force, which may cause brake wear and warrant an increase of the finite time period to reduce or avoid such brake wear. Phrased differently, by increasing the finite time period in such a situation, a technical benefit may include that the brakes (or brake) are given more time to be properly released before any propulsion torque is applied, thus reducing the risk of concurrent application of both propulsion and braking torque leading to such brake wear.

Optionally in some examples, including in at least one preferred example, the reinforcement learning model may be implemented by the controller and be configured to increase the finite time period in response to determining that, as an indication of clutch wear, the vehicle is not moving even though propulsion torque is being applied to a clutch connected to the at least one wheel or wheel axle. This may serve as an indication that the clutch is currently slipping, which may cause clutch wear and warrant an increase of the finite time period to reduce or avoid such clutch wear. Just as above, by increasing the finite time period in such a situation, a technical benefit may include that the brakes (or brake) are given more time to be properly released before any propulsion torque is applied, thus reducing the risk of concurrent application of both propulsion and braking torque leading to such clutch wear.

In other examples, the reinforcement learning model may be implemented external to the controller, e.g. by a cloud-based server, another dedicated module of the vehicle, or similar. It is then envisaged that the controller is further equipped with the means necessary to communicate with such an external entity, e.g. using wireless and/or wired communication or similar. A technical benefit may include that e.g. less computational power is required within the vehicle itself, and/or that data from multiple vehicles may be used to determine e.g. a suitable finite time period for one or more of such vehicles.

Optionally in some examples, including in at least one preferred example, to (automatically) initiate the release of the brake and (automatically) inhibit the application of propulsion torque may be performed sufficiently simultaneously or concurrently to avoid any propulsion torque from being applied to the at least one wheel or wheel axle while the brake is still applied, with the apparent advantages and technical benefits as already discussed herein.

According to a second aspect of the present disclosure, there is provided an automated brake-release system for a vehicle. The system includes a brake for braking of at least one wheel or wheel axle of the vehicle. The system further includes a controller as described herein with reference to the first aspect, or any examples thereof disclosed and discussed herein. As envisaged herein, the controller may e.g. include suitable processing circuitry which can execute program code instructing the controller to perform a method, or similar, as will be further elaborated on later herein.

According to a third aspect of the present disclosure, there is provided a vehicle which includes the controller of the first aspect or the automated brake-release system of the second aspect, or any examples thereof disclosed and discussed herein. The vehicle may e.g. be a heavy or semi-heavy vehicle, such as e.g. a truck, bus, tractor, or any other vehicle for which there is a desire to have such an automated brake-release system, and wherein, if not using the envisaged controller, excessive brake and/or clutch wear may result due to e.g. the brakes being slower to release than propulsion torque being applied and thereby increasing the risk that brake and propulsion forces are concurrently applied.

According to a fourth aspect of the present disclosure, there is provided a method for a controller for a vehicle (such as the controller of the first aspect). The method includes determining a take-off intent. The method further includes, in response to determining the take-off intent, i) (automatically) initiating a release of a brake for at least one wheel or wheel axle of the vehicle, and ii) (automatically) inhibiting an application of propulsion torque to the at least one wheel or wheel axle during a finite time period related to a time required for releasing the brake (as described earlier herein).

According to a fifth aspect of the present disclosure, there is provided a computer program (product) that includes computer code/instructions that, when executed by processing circuitry of a controller of a vehicle (such as e.g. the controller of the first aspect), causes the controller to perform the method of the fourth aspect or any example thereof disclosed and discussed herein.

According to a sixth aspect of the present disclosure, there is provided a (non-transitory) computer-readable storage medium which includes instructions/computer code that, when executed by (processing circuitry of) a controller of a vehicle (such as the controller of the first aspect), causes the controller to perform the method of the fourth aspect or an example thereof disclosed and discussed herein.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein. There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 2 is a flowchart of an exemplary method according to the present disclosure.

FIGS. 3A-3C are flowcharts of exemplary methods according to the present disclosure.

FIGS. 4A and 4B schematically illustrates exemplary controllers according to the present disclosure.

DETAILED DESCRIPTION

The detailed description set forth below provides information and examples of the disclosed technology with sufficient detail to enable those skilled in the art to practice the disclosure.

As discussed earlier herein, contemporary automated brake-release systems often implement open-loop control in a way that allows concurrent application of both propulsion torque and braking torque during take-off. This is because the time needed to fully release the brake is often longer than the time required to generate sufficient take-off torque. For vehicles that perform multiple, such as hundreds, of stop-and-go operations each day, this may lead to excessive brake and/or clutch wear. As will now be described in more detail, a solution as presented herein may allow to overcome such issues, by introducing a finite time period after initiating the release of the brakes and during which no or little propulsion torque is allowed. This may reduce or even avoid such excessive brake and/or clutch wear, while still allowing for open-loop control and without having to rely on more complicated closed-loop control based on e.g. brake pressure sensors or similar.

Figure 1A:
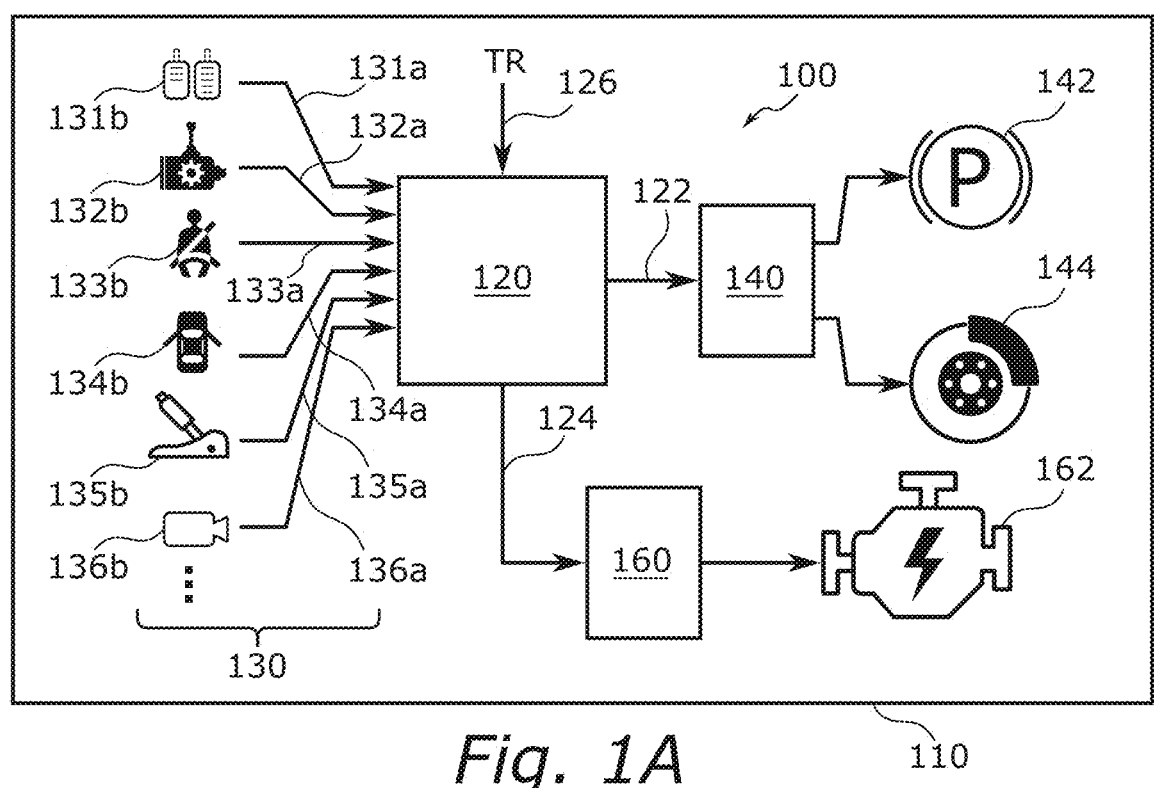
FIGS. 1A and 1B schematically illustrate exemplary automated brake-release systems according to the present disclosure.

FIG. 1A schematically illustrates an example of an automated brake-release system 100 (also referred to as just a "system") for a vehicle 110 as envisaged herein. The system 100 includes a controller 120 that is configured to determine whether there is a take-off intent. As used herein, a "take-off intent" means that a driver, cabin crew or for example an automated driving system wants for the vehicle 110 to start rolling after having been stopped/parked. For example, the vehicle 110 may be a garbage/refuse truck, and the driver may have returned to the cabin of the vehicle 110 after having been outside in order to empty a garbage bin into the truck. Once returning back to the cabin, the driver now wants to start driving again. Another example includes a bus driver having stopped to pick up one or more passengers, and which is now ready to start driving towards the next bus stop on the planned route. Yet another example includes a delivery truck in which the driver has previously been outside in order to deliver goods, and where the driver is now back inside the cabin and wants to start driving towards the next destination. Yet another example includes a self-driving vehicle which has e.g. stopped to pick up a passenger, and which is now ready to drive the passenger to a desired destination. In all such examples, there is thus a take-off intent in form of a desire (by either a driver, cabin crew, automated driving system, or similar) to start driving the vehicle again.

To determine whether there is a take-off intent or not, the controller 120 may be configured to receive one or more signals 130. The one or more signals 130 may be provided directly to the controller 120 (as shown in FIG. 1A), or may be received via a common bus (such as e.g. a CAN-bus or similar; not shown in FIG. 1A) of the vehicle 110. One example of such a signal is a signal 131a indicating a depressing of a throttle pedal 131b of the vehicle, which may serve as an indication that the driver of the vehicle 110 wants for the vehicle 110 to start moving, and thereby signaling the take-off intent. Another example of such a signal is a signal 132a indicating a shifting or engaging of a transmission/gearbox 132b of the vehicle 110, which may also serve to signal the take-off intent. For example, in order to make the vehicle 110 start moving, the driver may shift the gearbox from a parking mode to a drive mode, or similar. As another example, if the gearbox is instead manually operated, the signal 132a may indicate that the driver depresses a clutch pedal of the vehicle 110, and/or that the driver shifts the gearbox 132b from e.g. a neutral to a gear suitable for starting the vehicle 110, or similar. Yet another example of such a signal may include a signal 133a that indicates a fastening of a seatbelt 133b of the vehicle 110, indicating that the driver now wants to start driving the vehicle. The signal 133a may of course also, or in addition, indicate that e.g. a passenger of the vehicle 110 has fastened its seatbelt, which may also signal a take-off intent in situations where it is the passenger, in addition to or instead of the driver, that enters and exits the vehicle 110 multiple times during a normal workday. Yet another example of such a signal may include a signal 134a that indicates a closing of a door 134b of the vehicle 110, such as when e.g. the driver (or passenger) of the vehicle 110 has returned back into the vehicle 110 and prepares to take off. Yet another such a signal may include a signal 135a that indicates a releasing of a parking brake handle (or button) 135b. Yet another example of such a signal may include a signal 136a that indicates that a camera 136b within e.g. the cabin of the vehicle 110 has recorded an event which indicates that the driver wants to start driving the vehicle 110. For example, the camera 136b may record that the driver is now sitting at a steering wheel of the vehicle 110, that the driver's hands are at the steering wheel, that e.g. the driver's foot are at the throttle pedal 131b, or that the driver (or passenger) performs any other action indicative of a take-off intent.

An additional/alternative signal may e.g. indicate that the driver interacts with a steering wheel of the vehicle after not having interacted with the steering wheel for a predefined time (thus indicating that the driver is now back in the cabin and ready to take off). Another additional/alternative signal may e.g. come from a presence/occupancy detector in a seat of the driver and/or passenger of the vehicle 110, indicating that the driver and/or passenger is back in the seat after having left the seat, or similar. There may, in addition or instead of the signals discussed above, be other one or more signals provided to the controller 120, and from which the controller 120 may derive whether there is a current take-off intent or not. Any of the signals discussed herein may of course also be used in combination, such that the probability of making a correct determination of the take-off intent is increased by detecting that multiple signals indicate a same thing, or similar.

The controller 120 is further configured to, in response to having determined the take-off intent, automatically initiate a release of a brake of the vehicle 110. Such a brake may e.g. be a parking brake 142, service (or work) brake 144, or any other brake of the vehicle 110 which is capable of braking at least one wheel or wheel axle of the vehicle 110. As envisaged herein, the brake which is to be released may of course also be any combination of such brakes, such as e.g. a combination of both the parking brake 142 and the service brake 144. To initiate the release of the brake, the controller 120 may be configured to communicate directly with the brake, or e.g. to communicate with a dedicated brake controller 140 which in turn controls the brake (e.g. one or more of the parking brake 142 and service brake 144). The controller 120 may for example be configured to initiate the release of the brake by sending a message 122 to the dedicated brake controller 140, instructing the brake controller 140 to control e.g. the parking brake 142 and/or service brake 144 such that any braking force currently applied to the at least one wheel or wheel axle of the vehicle 110 is eventually removed. As envisaged herein, such release of braking force does not appear instantly, and there will therefore be some delay between when the request for release is sent and when there is no longer any substantial braking force being applied to the at least one wheel or wheel axle.

The controller 120 is further configured to, in response to having determined the take-off intent, inhibit an application of propulsion torque to the at least one wheel or wheel axle of the vehicle 110 that is currently being braked, during a finite time period TR that is related to a time required for releasing the brake. The finite time period TR may e.g. be received by the controller 120 via a signal 126, or be obtained internally within the controller 120.

To inhibit the application of propulsion torque, the controller 120 may be configured to communicate with an engine 162 of the vehicle 110. The engine 162 may for example be an internal combustion engine (ICE), an electric machine, or e.g. a combination of ICE and electric machines (such as found in e.g. hybrid vehicles), or any other combination of one or more motion devices capable of generating propulsion torque to the at least one wheel or wheel axle in order to propel the vehicle 110. The controller 120 may be configured to communicate directly with the engine 162, and/or e.g. be configured to communicate with a dedicated engine controller 160 which may in turn communicate with the engine 162.

The controller 120 may for example be configured to send a message 124 to the dedicated engine controller 160, wherein the message 124 includes an instruction for the engine 162 to avoid outputting any (or to at least an amount of outputted) propulsion torque to the at least one wheel or wheel axle until a lapse of the finite time period TR. For example, the message 124 may include an instruction to avoid outputting any (or at least reduce an amount of) such propulsion torque for the next X milliseconds (or similar) after receiving the message 124. The message 124 may be received, analyzed and acted upon by the dedicated engine controller 160, such that no such propulsion torque is applied by the engine 162 to the at least one wheel or wheel axle of the vehicle 110 during the following X milliseconds. In other examples, the message 124 may instead include an instruction to limit the outputted propulsion torque for the next X milliseconds after receiving the message 124, wherein the limit is such that the resulting propulsion torque is less than a predefined value. This predefined value may e.g. be set such that the outputted propulsion torque does cause any harm to the brake, transmission 132*b* and/or the at least one wheel or wheel axle if applied concurrently with the braking force applied by the brake. Phrased differently, the message 124 may include a propulsion torque inhibit command/request to the engine controller 160 (or directly to the engine 162, if the controller 120 is so configured).

Although FIG. 1A illustrates the system 100 as including several functional modules 120, 140 and 160, it is of course envisaged also that two or more of these functional modules 120, 140 and 160 may be combined into a single module, thus reducing the total number of modules. For example, it is envisaged also that the functionality of a "dedicated brake controller" may be implemented directly in the controller 120, and/or that the functionality of a "dedicated engine controller" may be implemented directly in the controller 120, or similar. When referring to a "controller", it is thus meant any module capable of performing at least the functionality described herein with reference to the controller 120.

The above-discussed "finite time period" TR is related to a time required for releasing the applied brake to the at least one wheel or wheel axle of the vehicle 110. For example, if it is estimated or otherwise known that to release the brake will take X milliseconds after the message 122 is sent to the dedicated brake controller 140, the finite time period TR may be defined to also be X milliseconds or at least close to X milliseconds. The exact length of the finite time period TR may thus depend on exactly how the brake is configured, how much delay is present when communicating with the various functional modules of the vehicle 110, and similar. In one example, the finite time period TR may be determined based on known parameters of the brake 142/144 and brake controller 140, and e.g. be provided from factory or configurable by other means such as a user input terminal or similar. As will be discussed later herein, it is envisaged also that the finite time period TR may be determined and/or updated using reinforcement learning.

In summary of FIG. 1A, the envisaged controller 120 and automated brake-release system 100 thus provides the possibility to, based on one or more signals 130, determine that there is a take-off intent, and to in response thereto automatically initiate both a release of an applied brake of the at least one wheel or wheel axle of the vehicle 110, and also inhibit the application of propulsion torque to the at least one wheel or wheel axle until the brake has been sufficiently released. This to avoid concurrent application of both propulsion torque and braking torque, which may otherwise damage or at least cause unnecessary wear of the transmission 132*b*, the engine 162, and/or the brake (such as the parking brake 142 and/or service brake 144). The envisaged system 100 is thus particularly useful in situations wherein the vehicle 110 performs multiple stop-and-go operations during a day, wherein e.g. hundreds of such stop-and-go operations a day would otherwise cause excessive and unnecessary wear if propulsion torque and braking torque were applied concurrently each time. By simply introducing the finite time period TR during which the engine 162 is inhibited to output any or much propulsion torque to the at least one wheel or wheel axle of the vehicle 110 that is currently being braked, the controller 120 may continue to use simple open-loop control to obtain the desired effect, and without any need for further sensors such as e.g. brake pressure sensors, brake force sensors, or similar. This thus allows for the envisaged automated brake-release system 100 to be implemented at low cost, and with the possibility to e.g. upgrade an already existing such system by making changes to the controller thereof in order to implement the finite time period TR to avoid or inhibit the concurrent application of both propulsion torque and braking torque.

As used herein, a "brake" may e.g. be a hydraulic brake, a pneumatic brake, a mechanical brake, or similar, or any combination thereof. In particular, it is envisaged any type of brake that may apply braking force (or braking torque) to the at least one wheel or wheel axle of the vehicle 110, and wherein a time required to release such an applied braking force/torque to the at least one wheel or wheel axle of the vehicle 110 is longer than a time required to apply propulsion force to the at least one wheel or wheel axle using the engine 162. As further envisaged herein, the messages 122 and 124 to initiate the release of the brake and to inhibit the application of the propulsion torque during the finite time period TR, respectively, may be sent simultaneously or at least sufficiently close together to avoid concurrently applying both propulsion torque and braking torque.

In some examples of the system 100 as envisaged herein, the controller 120 may further be configured to use the one or more signals 130 to determine that there is a stop intent, and to automatically apply the brake to the at least one wheel or wheel axle of the vehicle 110 by using e.g. the parking brake 142 and/or service brake 144. That there is a stop intent may for example include to determine an intent of a driver and/or passenger of the vehicle 110 to leave the vehicle 110. For example, the signal 131a may also indicate a releasing of the throttle pedal 131b from a depressed position, which may indicate that the driver is about to stop the vehicle 110 soon, or that the driver has already stopped the vehicle 110. Similarly, the signal 132a may instead indicate that the transmission/gearbox 132b of the vehicle 110 has been disengaged or shifted in way indicating that a stopping is imminent or already occurring. For example, the signal 132a may indicate that the gearbox 132b has been shifted from a drive position to a neutral or park position. If the gearbox 132b is manually operated, another indication may include that the gearbox 132b is shifted from a gear suitable for driving (e.g. a higher gear) towards a lower gear or to a neutral, or similar. As another example, the signal 133a may indicate a releasing of the seatbelt 133b of the vehicle 110, and thus indicate that the driver and/or passenger are about to exit the cabin of the vehicle 110. As yet another example, the signal 134a may indicate an opening of the door 134b of the vehicle 110, and thus indicate that the driver and/or passenger are likely to soon leave the vehicle 110. As yet another example, the signal 135a may indicate an activation of the parking brake handle (or button) 135b, and thus indicate that the vehicle 110 has stopped and that the driver and/or passenger are likely to soon leave the vehicle 110. As yet another example, the signal 136a may indicate that the camera 136b has recorded an event indicative of the driver and/or passenger either leaving or being about to leave the vehicle 110. For example, the camera 136b may record the driver and/or passenger putting on a jacket, moving a hand towards a door opener, or any other event which may indicate a potential leaving of the vehicle 110. As an example of additional or alternative signals, the occupancy sensor of a seat of the vehicle 110 may indicate that the driver and/or passenger has left their seat. As yet another example, satellite navigation and/or map data may be used to guess whether the vehicle is soon to stop and the driver and/or passenger to leave the vehicle, and to take action accordingly based thereon. For example, a delivery vehicle may have its daily route programmed in form of coordinates at the destinations it is to visit, and the controller 120 (or a device connected to the controller 120) may compare current position data (obtained from e.g. a GPS, GLONASS, or similar, receiver) to the assumed stopping points for the destinations, to guess that the vehicle 110 will soon (or has already) come to a stop. Likewise, the controller 120 may e.g. receive an indication of a current speed of the vehicle 110, and assume that if the speed is zero or close to zero, the vehicle 110 has (or will) come to a halt, and assume that the driver and/or passenger has an intent to leave the vehicle 110. In general, it may be advantageous to combine the input from multiple signals and/or sensors, in order to e.g. require that a speed of the vehicle 110 is low or zero before drawing a conclusion that the brakes should be applied, or similar.

In one example, the controller 120 may be further configured to first check whether there is any brake applied to the at least one wheel or wheel axle of the vehicle 110 before determining the take-off intent. If no brake is applied, there may thus not be any need to attempt to initiate the release of the brake nor any need to attempt inhibiting the application of the propulsion torque. Phrased differently, the controller 120 may be configured to determine the take-off intent while the brake is applied, and in some examples to determine the take-off intent (and perform the release of the brake and inhibiting of the application of propulsion torque) only in response to first determining that there is an applied brake.

In a further example, the controller 120 may be further configured to end the inhibiting of the application of propulsion torque in response to a lapsing of the finite time period. With the finite time period defined such that it (at least approximately) matches the time needed to release the brake, application torque may then be allowed once the brake has been released, in order to avoid e.g. unnecessary delay between detecting the take-off intent and allowing the vehicle 110 to start moving. For example, the controller 120 may be configured to start a clock measuring a time that passes since initiating the release of the brake. Once the measured time exceeds the predefined time period (e.g., the measured time exceeds X milliseconds), the controller 120 may assume that the brake has now been released and that propulsion torque should be allowed. The clock may then be stopped and/or reset, and made ready to start again once another, subsequent take-off intent is determined by the controller 120.

Figure 1B:
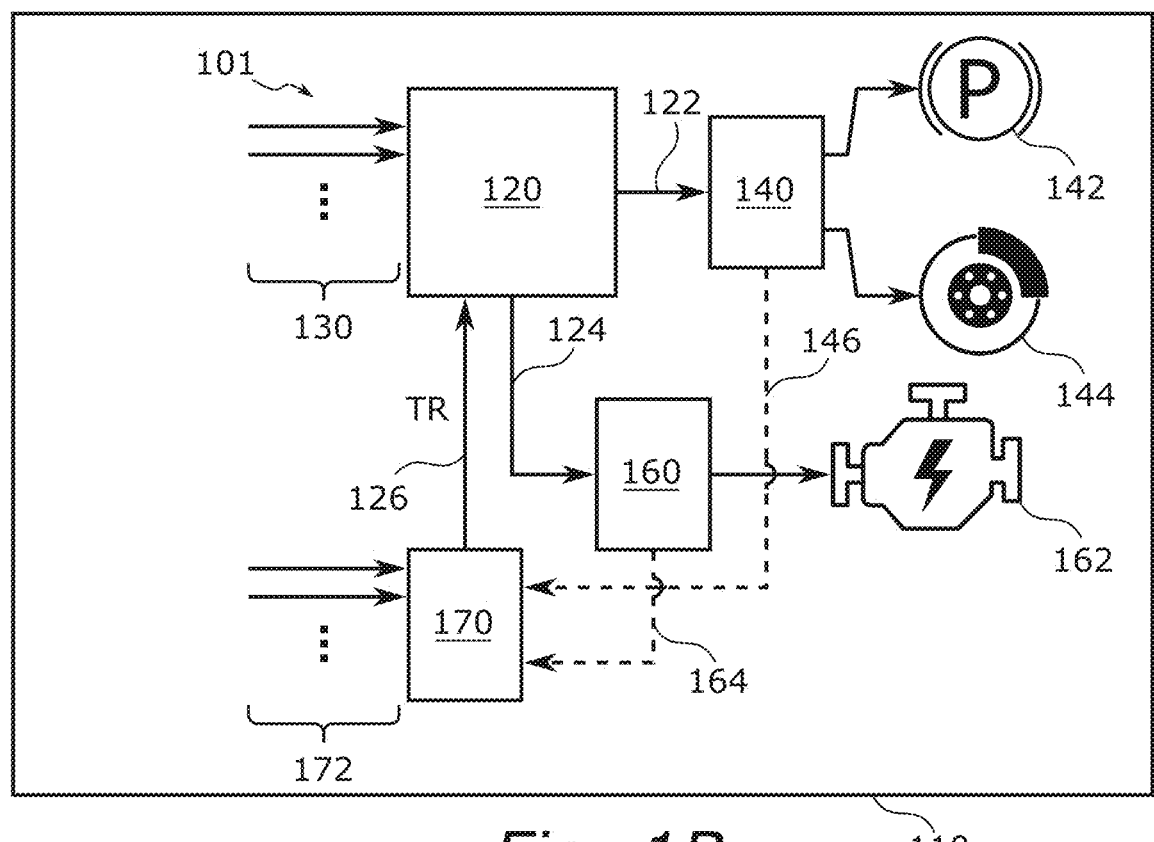

FIG. 1B schematically illustrates another example of a system 101 for a vehicle 110 similar to the system 100 described with reference to FIG. 1A, but where the system 101 and/or the controller 120 further includes a reinforcement learning (RL) module 170. In what follows, only the difference between the system 100 and the system 101 will be described.

The RL module 170 is configured to receive one or more signals 172 indicative of brake wear and/or clutch wear during take-off of the vehicle 110. The RL module 170 is further trained to, based on one or more signals 172, determine and/or update the finite time period TR.

As one example, the one or more signals 172 may include information about a speed or movement of the vehicle 110 and information whether the at least one wheel or wheel axle is currently rotating. If determining that the vehicle is moving even though the at least one wheel or wheel axle is not rotating, the RL module 170 may deduce that there is unnecessary brake wear caused by concurrent application of both propulsion torque and braking torque, i.e. that the brake is still being applied to the at least one wheel after the vehicle 110 starts to move. In response thereto, the RL module 170 may decide to increase the finite time period TR such that the brake is given more time to release before any propulsion torque is allowed. The RL module 170 may for example increase the finite time period TR by a fixed, predefined amount, and later evaluate whether such an efficient increase was enough to prevent further concurrent application of braking torque and propulsion torque to the at least one wheel or wheel axle of the vehicle 110. If still detecting such brake wear, the RL module 170 may decide to further increase the finite time period TR, and so on and so forth, until a satisfying value of the finite time period TR has been obtained. Of course, due to changing conditions such as weather, temperature, brake age, and similar, the finite time period TR required to sufficiently avoid such brake wear may have to be updated several times during the lifetime of the vehicle 110, and the RL module 170 may be configured to perform such repeated updates.

As another example, the one or more signals 172 may include information about a speed/movement of the vehicle 110 (and/or a about a rotation of the at least one wheel or wheel axle) and information about a propulsion torque currently being applied to a clutch connected to the at least one wheel or wheel axle of the vehicle 110. If determining that the vehicle is not moving even though propulsion torque is currently being applied, the RL module 170 may deduce that there is unnecessary clutch wear caused by concurrent application of both propulsion torque and braking torque. For example, this may indicate that the clutch is currently slipping, as propulsion torque is being applied without the at least one wheel or wheel axle (and/or the whole vehicle 110) currently moving/rotating. The RL module 170 may then, in response thereto, determine to increase the finite time period TR to allow the brake more time to release before the propulsion torque is applied. As above, such an adjustment of the finite time period TR may have to be repeated until a satisfying result (in terms of no clutch slip) is detected, and/or in response to changing conditions such as weather, temperature, clutch age, etc.

As illustrated in FIG. 1B, the RL module 170 may receive the information it needs from the signals 172, but optionally also from signals 142 and 162 from the brake controller 140 and engine controller 160, respectively, and/or from any of the signals 130. For example, the signal 142 may provide information regarding whether the brake is still applied (and regarding how much braking torque that is currently being applied), and the signal 162 may provide information regarding whether propulsion torque is currently applied (and regarding how much propulsion torque that is currently being applied/generated by the engine 162). It is of course also envisaged that at least some of the one or more signals 172 may also correspond to, or be, one or more of the signals 130 provided to the controller 120, e.g. the signal 132*a* providing information about the transmission/gearbox 132*b* of the vehicle 110, and similar.

In summary of FIG. 1B, the RL module 170 allows the system 101 and the controller 120 to dynamically update and adjust the finite time period TR to match the specifications of the brake, and to also adapt to changing conditions of the vehicle 110 and its drive train and brakes, and similar. The finite time period TR does therefore, in such an example, not need to be decided e.g. already at the factory, but may instead be determined using the RL module 170.

Although FIG. 1B illustrates the RL module 170 as a separate entity, the RL module 170 may in other examples be implemented as part of the controller 120, and the signals 172 and optionally 142 and/or 162 may then be provided to the controller 120 instead. Likewise, if the RL module 170 does not form part of the controller 120 and also not part of the system 101, the RL module 170 may instead e.g. be part of a cloud-based service. In such an example, the system 101 may be further configured to communicate with such a cloud-based service, using e.g. a suitable wireless interface (not shown), in order to send the signals 172 and optionally

142 and/or 162, and to receive the updated/determined value of the finite time period TR from the cloud-based RL service.

FIGS. 2 and 3A-3C schematically illustrate flowcharts of exemplary methods performed in the systems 100 and 101, and e.g. as performed within/by the controller 120.

With reference also to FIG. 2, a method 200 as envisaged herein includes a step S202 of determining a take-off intent. In response to determining the take-off intent, the method 200 proceeds with a step S204 of automatically initiating a release of a brake for at least one wheel or wheel axle of the vehicle 110. The method 200 further includes a step S206 of (automatically) inhibiting an application of propulsion torque to the at least one wheel or wheel axle of the vehicle 110 during the finite time period TR related to the time required for releasing the brake. As discussed earlier herein, the steps S204 and S206 may be performed simultaneously or at least concurrently, or at least with such a timing and ordering that the desired effect of avoiding concurrent application of both propulsion torque and braking torque is achieved after the take-off intent is determined. As further discussed herein, the finite time period TR may be received from an external source, and/or determined internally in the controller 120 and/or by the ML module 170.

The method 200 may also include an optional (as indicated by the dashed box) step S201 of first confirming that the brake is currently being applied to the at least one wheel or wheel axle of the vehicle 110 before eventually proceeding to step S202. If it is determined in optional step S201 that no such brake is currently being applied, the method may either stop or loop-back to step S201 until the brake is applied. As discussed earlier herein, this avoids having to perform the remaining steps if there is no brake applied once the take-off intent is determined.

The method 200 may also include an optional (as indicated by the dashed box) step S208 of, in response to a lapsing of the finite time period TR, end the inhibiting of the application of propulsion torque. As discussed earlier herein, this may e.g. include measuring a time since the releasing of the brake was initiated in step S204, and to allow the propulsion torque to be applied in order to start propelling the vehicle 110 once the measured time exceeds the pre-defined time period TR.

Figure 3B:
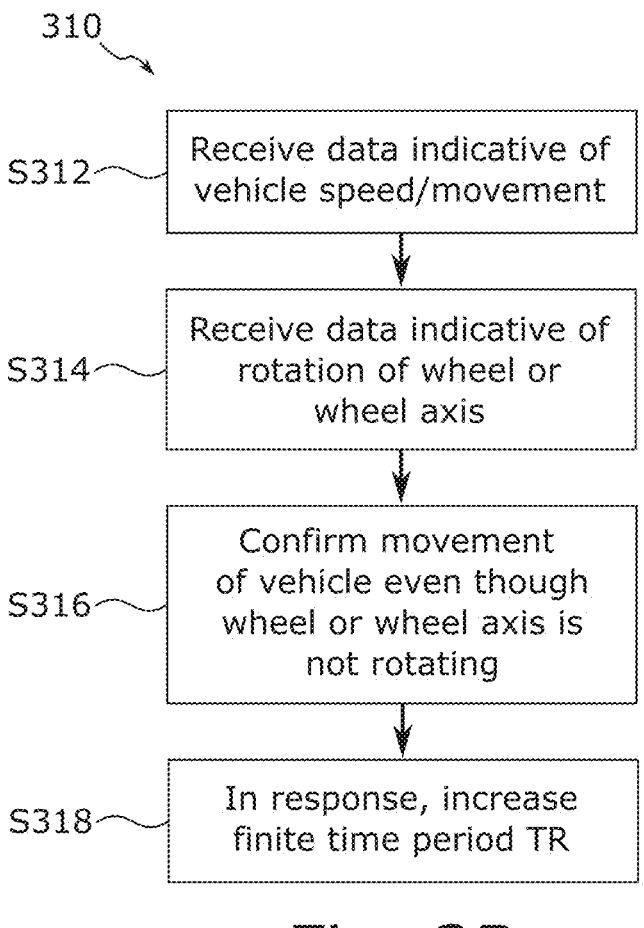

FIGS. 3A-3C illustrate flowcharts of methods performed in order to dynamically determine and/or adjust the finite time period TR based on actual conditions of the vehicle, which may be implemented e.g. as part of a reinforcement learning algorithm.

With reference to FIG. 3A, a method 300 includes a step S302 of receiving data indicative of brake wear and/or clutch wear during take-off of the vehicle 110. The method 300 further includes a step S304 of providing such data to a reinforcement learning (RL) module trained to determine and/or update the finite time period TR based on this data. The method 300 further includes a step S306 of determining and/or updating the finite time period TR based on the outcome of the RL module and step S304.

With reference to FIG. 3B, a method 310 performed in such an RL module includes a step S312 of receiving data indicative of a movement/speed of the vehicle 110. The method 310 further includes a step S314 of receiving data indicative of a rotation of the at least one wheel or wheel axle of the vehicle 110. The method 310 further includes a step S316 of confirming that there is movement of the vehicle 110 even though the at least one wheel or wheel axle is not moving. The method 310 further includes a step S318 of increasing the finite time period TR as a result of the confirming performed in step S316. There being movement of the vehicle even though the at least one wheel or wheel axle is not rotating may be used a sign of unnecessary brake wear, as the brake has not had time to sufficiently release before the propulsion torque is applied.

With reference to FIG. 3C, a method 320 also performed in such an RL module includes a step S322 of receiving data indicative of a movement/speed of the vehicle 110. The method 320 further includes a step S324 of receiving data indicative of a propulsion torque being applied to a clutch connected to the at least one wheel or wheel axle of the vehicle 110. The method 320 further includes a step S326 of confirming that there is no movement of the vehicle 110 even though propulsion torque is being applied to the clutch connected to the at least one wheel or wheel axle of the vehicle 110. The method 320 further includes a step S328 of increasing the finite time period TR as a result of the confirming performed in step S326. There being no movement of the vehicle even though propulsion torque is being applied to the clutch may be used as a sign of unnecessary clutch wear, as the clutch is slipping.

As envisaged herein, the methods 310 and 320 may of course also be modified such that, if there is no (or negative) confirmation in steps S316 and S326, respectively, the finite time period TR is instead left unchanged or even decreased. Decreasing the finite time period TR may e.g. for a quicker take-off for the vehicle 110, as there is less delay between e.g. depressing the throttle pedal and the vehicle 110 actually taking off, as long as there is no concurrent application of propulsion torque and braking force allowed.

Although not explicitly illustrated, the methods 310 and 320 may of course also be combined and implemented together in the RL module 170, such that an indication of either brake wear or clutch wear is used as a reason to increase the finite time period TR.

As envisaged herein, the methods 300, 310 and 320 may also be performed as part of the method 200 described with reference to FIG. 2, and implemented by for example the controller 120. In some examples, it is envisaged that the finite time period TR may have a factory-defined value, but that this factory-defined value may then be updated during actual operation of the vehicle 110 (by performing the steps shown in method 300, 310 and/or 320), and thereby account for changing conditions such as weather, vehicle age, temperature, and similar.

FIG. 4A schematically illustrates, in terms of a number of functional units, the components of an example controller 400 (such as the controller 120 described with reference to FIGS. 1A and 1B). The controller 400 is configured to detect/determine the take-off intent, to initiate the releasing of the brake, and to inhibit the application of propulsion force to the at least one wheel or wheel axle on which the brake is currently applied, as described earlier herein. For this purpose, the controller 400 includes processing circuitry 410. The processing circuitry 410 is provided using any combination of one or more of a suitable central processing unit (CPU), multiprocessor, microcontroller, digital signal processor (DSP), etc., capable of executing software instructions stored in a computer program product 510 (see FIG. 5 and the description thereof), e.g. in the form of a computer-readable storage medium 420. The processing circuitry 410 may further be provided as at least one application-specific integrated circuit (ASIC), or field-programmable gate array (FPGA).

Particularly, the processing circuitry 410 is configured to cause the controller 400 to perform a set of operations, or steps, as disclosed above e.g. when describing the method 200 illustrated in FIG. 2. For example, the storage medium 420 may store a set of operations, and the processing circuitry 410 may be configured to retrieve the set of operations from the storage medium 420 to cause the controller 400 to perform the set of operations. The set of operations may be provided as a set of executable instructions. Thus, the processing circuitry 410 is thereby arranged to execute methods associated with a controller 400 as disclosed herein e.g. with reference to FIG. 2. Optionally, the processing circuitry 410 and computer program product 510 may be such that the controller 400 is also configured to execute methods such as disclosed herein e.g. with reference to one, more or all of FIGS. 3A-3C.

The controller 400 may further include a communications interface 430 for communications with other entities, functions, nodes, and devices of the vehicle 110, and/or with one or more remote devices such as e.g. a cloud-based service or similar. For example, the communications interface 410 may allow the controller 400 to communicate with e.g. a brake controller, an engine controller, and/or various sensors of the vehicle 110. Examples of such sensors may, as discussed earlier herein, be e.g. sensors for a throttle pedal, a steering wheel, a transmission/gearbox, a parking brake lever, a cabin-mounted camera, a set occupancy sensor, a navigation unit and/or map data provider, a door sensor, an external RL module (if used), and similar. As such, the communication interface 430 may include one or more transmitters and receivers, including analogue and/or digital components. For example, the communication interface 430 may be configured to connect to one or more communication buses of the vehicle 110, such as for example one or more CAN-buses or similar.

The processing circuitry 410 controls the general operation of the controller 400 e.g. by sending data and control signals to the communications interface 430 and the storage medium 420, by receiving data and reports from the communications interface 430, and by retrieving data and instructions from the storage medium 420. Other optional components, as well as their related functionality, of the controller 400 are represented by the dashed box 440, and the description thereof is omitted in order not to obscure the concepts presented herein.

Generally, a controller (such as the controller 120 and/or 400) may be a separate controller of the vehicle 110, or e.g. be implemented as part of an already existing controller of the vehicle 110, such as for example a vehicle electronic control-unit (ECU), or similar. The same applies to the RL module 170, which may be implemented as a separate unit, as part of the controller, or as part of some other controller of the vehicle. As described earlier herein, the RL module 170 may also be implemented as part of an external service, such as a cloud-based service or similar.

FIG. 4B schematically illustrates, in terms of a number of functional modules/blocks 410a, 410b and 410c, the components of an exemplary controller 400 (such as the controller 120). The controller 400 includes at least a take-off intent determination module 410a configured to perform step S202 of the method 200 described with reference to FIG. 2. The controller 400 also includes a brake-release initiation module 410b configured to perform step S204, and a propulsion torque inhibit module 410c configured to perform step S206. The controller 400 may also include one or more optional functional modules (illustrated by the dashed box 410d), such as for example a brake-applied confirmation module for performing optional step S201, a propulsion torque allowance module for performing optional step S208, and/or one or more modules for implementing the reinforcement learning algorithm described with reference to FIGS. 3A-3C.

In general terms, each functional module 410a-d may be implemented in hardware or in software. Preferably, one or more or all functional modules 410a-d may be implemented by the processing circuitry 410, possibly in cooperation with the communications interface 430 and/or the storage medium 420. The processing circuitry 410 may thus be arranged to from the storage medium 420 fetch instructions as provided by a functional module 410a-d, and to execute these instructions and thereby perform any steps of the method 200 performed by/in the controller 400 as disclosed herein.

Figure 5:
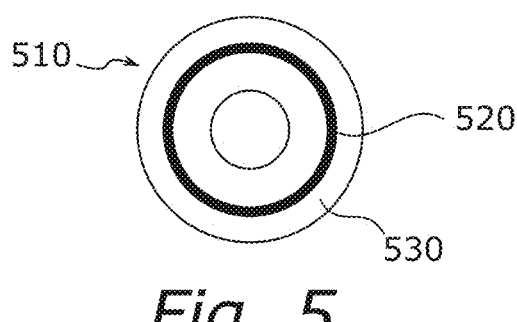
FIG. 5 schematically illustrates a computer-readable storage medium according to the present disclosure.

FIG. 5 schematically illustrates a computer program product 510 including a computer-readable medium 530. On the medium 530, a computer program 520 may be stored, which computer program 520 may cause the processing circuitry 410 and thereto operatively coupled entities and devices, such as the communication interface 430 and the storage medium 420, to execute method 200 according to examples described herein, and/or e.g. one or more of the methods 300, 310 and 320. The computer program 520 and/or computer program product 510 may thus provide means for performing any steps of e.g. the method 200 performed by the controller 400 as disclosed herein. It is also envisaged herein that the medium 530 may store more than one computer program, such as one program for the method 200, one program for the method 300, one program for the method 310, and one program for the method 320, or similar.

In the example of FIG. 5, the computer program product 510 is illustrated as an optical disc, such as a CD (compact disc) or a DVD (digital versatile disc) or a Blu-Ray disc. The computer program product 510 may also be embodied as a memory, such as a random-access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 520 is here schematically shown as a track on the depicted optical disk, the computer program 520 may be stored in any way which is suitable for the computer program product 510.

The various examples described herein, such as the controller 100 and/or 400, may also be implemented as part of a more generic computer system, as will now be described in more detail.

Figure 6:
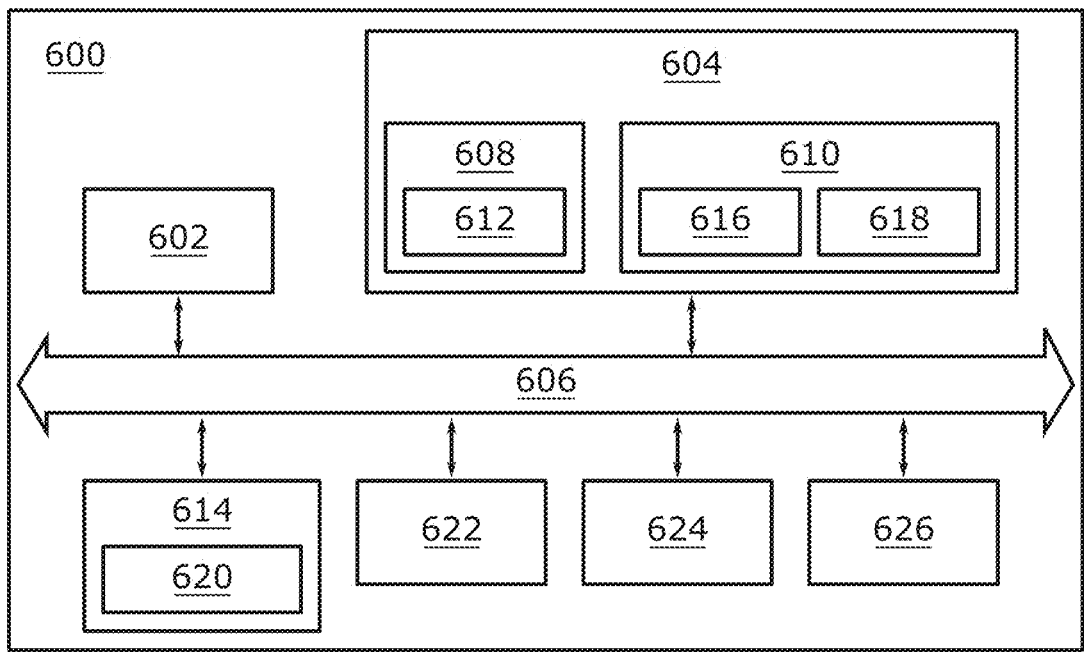
FIG. 6 is a schematic diagram of a computer system for implementing examples disclosed herein, according to an example.

FIG. 6 is a schematic diagram of a computer system 600 for implementing examples disclosed herein. The computer system 600 is adapted to execute instructions from a computer-readable medium (such as 530) to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Figure 7:
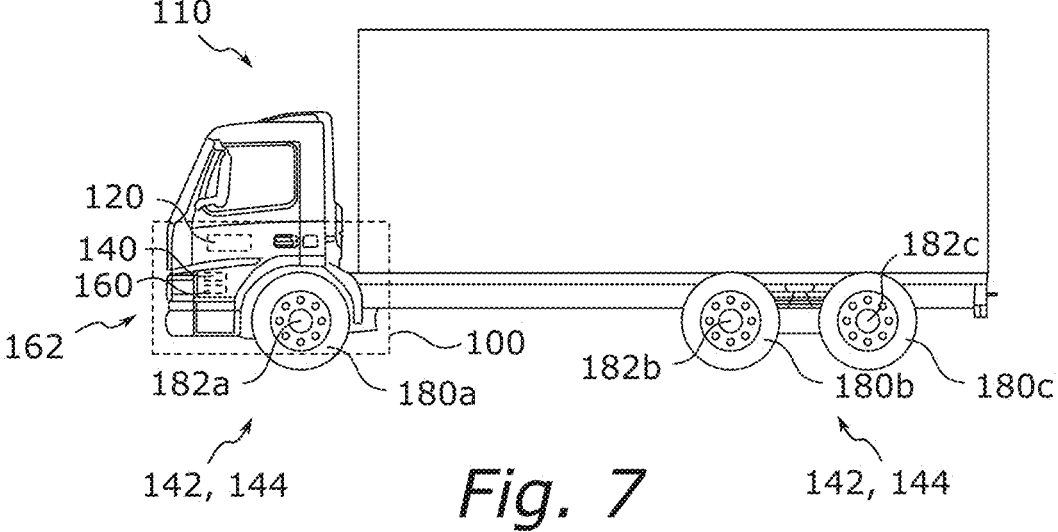
FIG. 7 schematically illustrates an exemplary vehicle according to the present disclosure.

FIG. 7 schematically illustrates a vehicle as envisaged herein, exemplified in form of a truck 110. The truck 110 has wheels 180*a*, 180*b*, 180*c* provided on respective wheel axles 182*a*, 182*b* and 184*c*. There are, of course, also wheels provided on the other side of the truck 110 that are not shown in FIG. 7. The truck 110 further has at least one brake 142, 144 configured to brake at least one of the wheels 180*a*-*c* or wheel axles 182*c*, for example automatically in response to determining that the truck 110 has come to a halt and that there is an intent for a driver and/or passenger of the truck 110 to leave the truck 110. The at least one brake 142, 144 is controlled by a brake controller 140 of the vehicle 110.

The at least one brake 142, 144 may e.g. be a service-brake, a parking-brake, or similar. There may e.g. be one such brake provided for each wheel 180*a*-*c*, or at least for each wheel axle 182*a*-*c*. In other examples, there may be no such brakes provided for one or more of the wheels 180*a*-*c* and/or wheel axles 182*a*-*c*. The truck 110 also has at least one engine (and/or other motion device, such as one or more electrical machines) 162 capable of propelling the truck 110 by applying torque (via a transmission/drive train, if needed) to at least one of the wheels 180*a*-*c* and/or wheel axles 182*a*-*c*. The engine 162 may e.g. be controlled by an engine controller 160 of the vehicle 110.

The truck 110 further has an automated brake-release system 100 which includes the controller 120, configured to automatically release the applied brake(s) 142, 144 in response to determining that there is a take-off intent as described earlier herein. More importantly, the system 100 and the controller 120 are configured to inhibit application of propulsion torque to the at least one wheel or wheel axle during the finite time period TR, to avoid (or at least partially reduce) concurrent application of both propulsion and braking torque. The truck 110 of course only serve to illustrate one example vehicle in which the automated brake-release system 100 and controller 120 are applicable.

The following is a list of examples of controllers, automated brake-release systems, vehicles, methods, computer program products and computer readable storage mediums as envisaged herein.

Example 1: A controller for a vehicle, configured to: determine a take-off intent, and, in response to determining the take-off intent, i) initiate a release of a brake for at least one wheel or wheel axle of the vehicle, and ii) inhibit an application of propulsion torque to the at least one wheel or wheel axle during a finite time period related to a time required for releasing the brake.

Example 2: The controller according to example 1, further configured to determine the take-off intent while the brake is applied.

Example 3: The controller according to example 1 or 2, wherein to determine the take-off intent comprises to detect a depressing of a throttle pedal of the vehicle and/or an engagement or shifting of a transmission of the vehicle.

Example 4: The controller according to any one of examples 1 to 3, wherein to determine the take-off intent comprises to detect a closing of a door of the vehicle.

Example 5: The controller according to any one of the preceding examples, wherein to determine the take-off intent comprises to detect a fastening of a seatbelt of the vehicle.

Example 6: The controller according to any one of examples 1 to 3, wherein to inhibit the application of propulsion torque comprises to send a propulsion torque limitation command to an engine or powertrain of the vehicle.

Example 7: The controller according to any one of the preceding examples, further configured to, before determining the take-off intent, automatically apply the brake in response to determining an intent of a driver or passenger of the vehicle to leave the vehicle.

Example 8: The controller according to example 7, wherein to determine the intent of the driver or passenger to leave the vehicle comprises to detect a release of a throttle pedal of the vehicle and/or a disengagement or shifting of a transmission of the vehicle.

Example 9: The controller according to example 7 or 8, wherein to determine the intent of the driver or passenger to leave the vehicle comprises to detect a releasing of a seatbelt of the vehicle.

Example 10: The controller according to any one of examples 7 to 9, wherein to determine the intent of the driver or passenger to leave the vehicle comprises to detect an opening of a door of the vehicle.

Example 11: The controller according to any one of examples 7 to 10, wherein to determine the intent of the driver or passenger to leave the vehicle comprises to detect an imminent stopping of the vehicle.

Example 12: The controller according to any one of the preceding examples, further configured to, in response to a lapsing of the finite time period, end said inhibiting of the application of propulsion torque.

Example 13: The controller according to any one of the preceding examples, further configured to determine and/or update a value of the finite time period by providing data indicative of brake wear and/or clutch wear during take-off of the vehicle to a reinforcement learning model trained to determine and/or update the value of the finite time period based on said data.

Example 14: The controller according to example 13, wherein the reinforcement learning model is implemented in said controller and configured to increase the finite time period in response to determining that, as an indication of brake wear, the vehicle is moving even though the at least one wheel or wheel axle is not rotating.

Example 15: The controller according to example 13 or 14, wherein the reinforcement learning model is implemented in the controller and configured to increase the finite time period in response to determining that, as an indication of clutch wear, the vehicle is not moving even though propulsion torque is being applied to a clutch connected to the at least one wheel or wheel axle.

Example 16: The controller according to any one of the preceding examples, wherein to initiate the release of the brake and inhibit the application of propulsion torque is performed sufficiently simultaneously or concurrently to avoid any propulsion torque from being applied to the at least one wheel or wheel axle while the brake is still applied.

Example 17: An automated brake-release system for a vehicle, comprising a brake for braking of at least one wheel or wheel axle of the vehicle, and a controller according to any one of the preceding examples.

Example 18: A vehicle comprising the controller according to any one of examples 1 to 16 or the automated brake-release system according to example 17.

Example 19: A method performed in a controller of a vehicle, comprising determining a take-off intent, and in response to determining the take-off intent, i) initiating a release of a brake for at least one wheel or wheel axle of the vehicle, and ii) inhibiting an application of propulsion torque to the at least one wheel or wheel axle during a finite time period related to a time required for releasing the brake.

Example 20: A computer program product comprising program code which, when executed by processing circuitry of a controller of a vehicle, causes the controller to perform the method according to example 19.

Example 21: A non-transitory computer-readable storage medium comprising instructions which, when executed by processing circuitry of a controller of a vehicle, causes the controller to perform the method according to example 19.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A controller for a vehicle, configured to:
   determine a take-off intent;
   in response to determining the take-off intent:
      initiate a release of a brake for at least one wheel or wheel axle of the vehicle; and
      inhibit an application of propulsion torque to the at least one wheel or wheel axle during a finite time period related to a time required for releasing the brake; and
   determine and/or update a value of the finite time period by providing data, indicative of brake wear and/or clutch wear during take-off of the vehicle, to a reinforcement learning model trained to determine and/or update the value of the finite time period based on the data.

2. The controller of claim 1, further configured to determine the take-off intent while the brake is applied.

3. The controller of claim 1, wherein determining the take-off intent comprises at least one of:

detecting a depressing of a throttle pedal of the vehicle and/or an engagement or shifting of a transmission of the vehicle;

detecting a closing of a door of the vehicle; and detecting a fastening of a seatbelt of the vehicle.

4. The controller of claim 1, further configured to, before determining the take-off intent, apply the brake in response to determining an intent of a driver or passenger of the vehicle to leave the vehicle.

5. The controller of claim 4, wherein determining the intent of the driver or passenger to leave the vehicle comprises at least one of:

detecting a release of a throttle pedal of the vehicle and/or a disengagement or shifting of a transmission of the vehicle;

detecting a releasing of a seatbelt of the vehicle;

detecting an opening of a door of the vehicle, and detecting an imminent stopping of the vehicle.

6. The controller of claim 1, further configured to:

in response to a lapsing of the finite time period, end the inhibiting of the application of propulsion torque.

7. The controller of claim 1, wherein the reinforcement learning model is implemented in the controller and configured to increase the finite time period in response to determining that, as an indication of brake wear, the vehicle is moving even though the at least one wheel or wheel axle is not rotating.

8. The controller of claim 1, wherein the reinforcement learning model is implemented in the controller and configured to increase the finite time period in response to determining that, as an indication of clutch wear, the vehicle is not moving even though propulsion torque is being applied to a clutch connected to the at least one wheel or wheel axle.

9. The controller of claim 1, wherein to initiate the release of the brake and inhibit the application of propulsion torque is performed sufficiently simultaneously or concurrently to avoid any propulsion torque from being applied to the at least one wheel or wheel axle while the brake is still applied.

10. An automated brake-release system for a vehicle, comprising:

a brake for braking of at least one wheel or wheel axle of the vehicle; and the controller of claim 1.

11. A vehicle comprising the controller of claim 1.

12. A method performed in a controller of a vehicle, comprising:

determining a take-off intent;

in response to determining the take-off intent:

initiating a release of a brake for at least one wheel or wheel axle of the vehicle; and inhibiting an application of propulsion torque to the at least one wheel or wheel axle during a finite time period related to a time required for releasing the brake; and determining and/or updating a value of the finite time period by providing data, indicative of brake wear and/or clutch wear during take-off of the vehicle, to a reinforcement learning model trained to determine and/or update the value of the finite time period based on the data.

13. A non-transitory computer-readable storage medium comprising instructions which, when executed by processing circuitry of a controller of a vehicle, causes the controller to perform the method of claim 12.

14. A vehicle comprising the automated brake-release system of claim 10.

* * * * *